Oct. 10, 1961 R. H. WISE 3,003,829
CROSS-HEAD BEARING
Filed Oct. 2, 1957 2 Sheets-Sheet 1

INVENTOR.
RALPH H. WISE
BY Redrow + Recktenwald
ATTORNEYS

Oct. 10, 1961 R. H. WISE 3,003,829
CROSS-HEAD BEARING
Filed Oct. 2, 1957 2 Sheets-Sheet 2

INVENTOR.
RALPH H. WISE
BY Redrow & Recktenwald
ATTORNEYS

United States Patent Office 3,003,829
Patented Oct. 10, 1961

3,003,829
CROSS-HEAD BEARING
Ralph H. Wise, Davis Island, Tampa, Fla., assignor, by mesne assignments, to The Anderson Company, a corporation of Indiana
Filed Oct. 2, 1957, Ser. No. 687,659
4 Claims. (Cl. 308—6)

This invention relates generally to a bearing and more particularly to a cross-head type bearing structure for use in motion-transmitting mechanisms.

Cross-head type bearings have been known and used for many generations to change a linear motion that is directed along one axis into a linear and possibly a rotary motion that is generally directed along an axis that may be parallel to the first-named axis or may lie at an angle relative thereto on either side of the first-named axis. Generally, the direction of motion is gradually changing from one extreme condition to another. Unfortunately, present-day cross-head type bearings are not capable of fulfilling all of the required conditions. That is, sometimes the angular change between the two parts is such that the two members wedge or bind relative to each other so that no motion is transmitted from one member to the other. This binding can cause serious damage to the different components of the driving mechanism.

Various types of bearings have been proposed, such as a block of low-friction material interfitting with a channel portion such as to be relatively movable therewith. Other types of bearings have used rollers and various other low-friction elements to transmit the different forces between the relatively movable parts. Practically all of these devices have met with limited success when they are relatively new and when they are operated within a very limited range such as to transmit forces practically along parallel axes. However, when the angular variation between the directions of motions of the two parts becomes large or when vibration is introduced into the system during the transmission of the motion from one to the other, a binding or wedging action results which jams the device with its attendant probable damage to the operative parts of the mechanism.

It is, therefore, a principal object of this invention to overcome the above-noted disadvantages of the prior art and to provide an improved cross-head type bearing that is operative under all conditions of use.

It is another important object of this invention to provide an improved cross-head type bearing which is substantially free from binding or wedging throughout its full cycle of operation.

It is still another object of this invention to provide an improved cross-head type bearing having built-in means for limiting longitudinal movement of the members relative to each other.

It is a further object of this invention to provide an improved cross-head type bearing having rollers for transmitting the uniaxially directed forces of one member into the biaxially directed forces of the other member.

It is still a further object of this invention to provide an improved cross-head type bearing that is compact in size and efficient in use.

And still another object of this invention is to provide an improved cross-head type bearing comprising a minimum number of components which can be economically manufactured and assembled on a production basis.

These and other objects and advantages of the invention will become apparent as the description of the same proceeds. The invention will be best understood from a consideration of the following detailed description taken in connection with the accompanying drawings forming part of the specification with the understanding, however, that the invention is not confined to any strict conformity with the showing of the drawings and may be changed or modified so long as such changes or modifications mark no material departure from the salient features of the invention as expressed in the appended claims.

Figure 1:
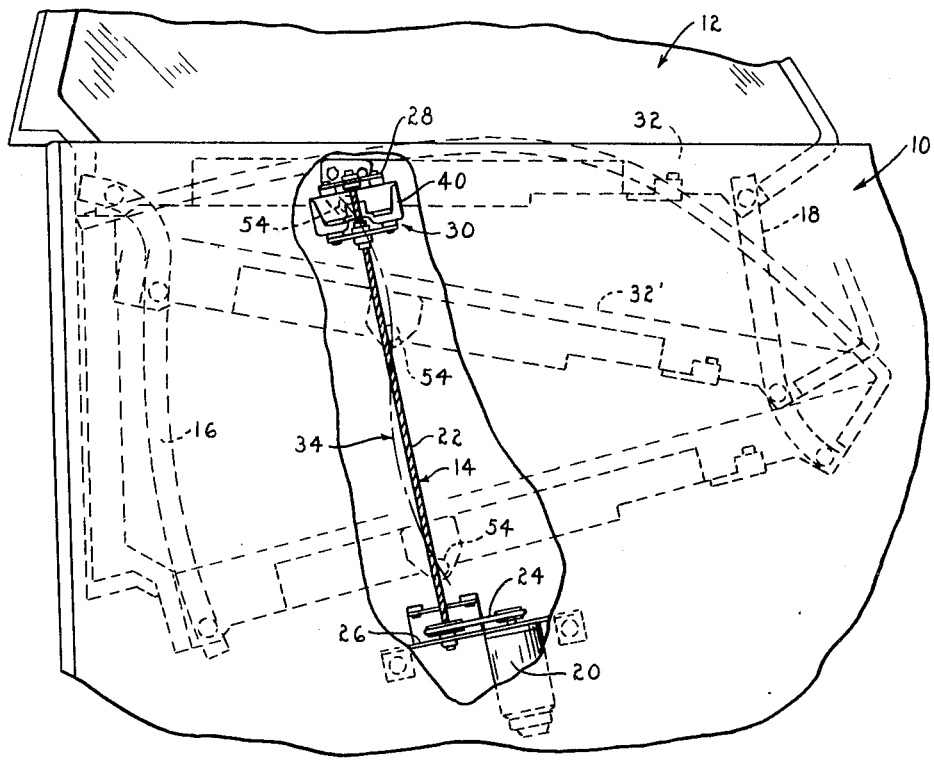
FIGURE 1 is a side elevational view, partly broken away and in section, of a portion of a vehicle door or vehicle panel section incorporating the improved cross-head type bearing of the present invention.

The invention as hereinafter disclosed may be utilized in many different applications, but as illustrated in FIGURE 1 of the drawings, is operatively associated with the window of an automotive vehicle. Referring particularly to FIGURE 1 of the drawings, there is shown a side panel of an automotive vehicle or automotive vehicle door 10 having a window 12 mounted for movement into and out of said panel by means of a power-actuated mechanism 14. For illustration purposes, the window 12 is guided in its movement by means of a pair of wheels engaging in spaced tracks 16 and 18, such that as the window is retracted into the door it will be moved first downwardly and rearwardly and finally in part forwardly as it traverses its cycle of operation. The power-operated mechanism 14 is composed of a motor 20 drivingly connected to a substantially vertically mounted helically threaded screw 22 by means of a pulley system 24. The screw 22 is mounted in bearings on the brackets 26 and 28 carried by the inner side of the panel or door 10 so as to have the axis of said screw lying at an angle with respect to the vertical for a later-to-be-described purpose. A reciprocative driving member in the form of a motion-transmitting nut member 30 is mounted in engagement with the screw 22 such as to be moved along the axis of the screw upon rotation thereof. The nut member 30 is operatively connected through a cross-head member to a rigid frame member 32 carried by the lower portion of the window 12, the latter constituting a driven member.

In constructions of this general type, the base of the window is maneuvered in several different directions within a plane coinciding with the plane of the window. In the illustrated example, the dotted line 34 is used to designate a path of movement of a point formed on the frame 32 of the window. By positioning the axis of the screw 22 relative to the dotted line 34, it is possible to substantially divide the deviation of the movement of the point on the frame 32 of the window equally on opposite sides of the axis of the screw 22. In order to provide the operative connection between the nut member 30 and the connection with the frame 32 on the base of the window, it is necessary to provide a bearing mechanism which is capable of providing means for changing the direction of motion from along the axis of the screw into a motion along an axis disposed either parallel to or at an angle relative to and laterally offset from the axis of the screw.

Figure 3:
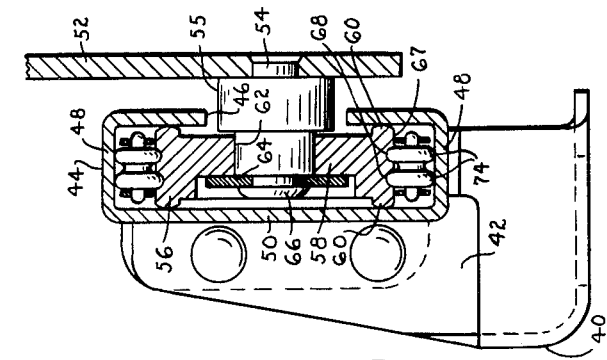
FIGURE 3 is a cross-sectional view taken on the line 3—3 of FIGURE 2.
Figure 4:
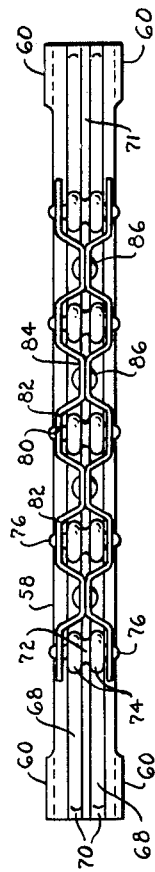
FIGURE 4 is a top view of the bearing elements and their carrier in position in the raceways of the bearing block.
Figure 2:
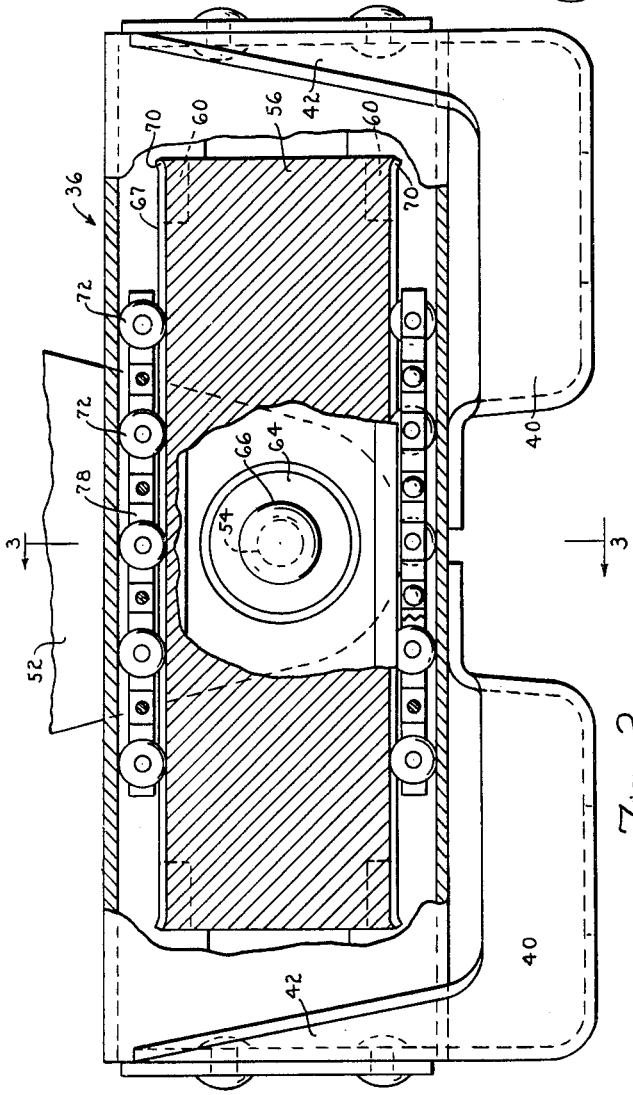
FIGURE 2 is an enlarged side view, partly broken away and in section, of the details of the improved cross-head type bearing.

Referring specifically to FIGURES 2, 3 and 4, the cross-head bearing 36 forming the subject matter of the instant invention is illustrated wherein the motion-transmitting nut 30 is operatively connected with the bracket member 40 having side portions 42 engaging with the back portion of an elongate C-shaped channel member 44 having an elongate, lengthwise opening 46 facing away from the bracket member 40. In cross-section, as shown in FIGURE 3, the C-shaped channel member 44 has a pair of bstantially parallel top and bottom walls 48 joined
gether in spaced apart relationship by a back wall 50.
In the illustrated form, the frame 32 of the window 12
s a depending plate 52 attached thereto in such a posi-
on that a pivot pin 54 carried by the lower portion of
e plate will move in the path designated by the dotted
e 34 as the window is raised and lowered. The pivot
1 54 has a collar 55 positioned thereon which extends
rough the slotted opening 46 in the channel. An elon-
te bearing block 56 is positioned within the confines
the C-shaped channel 44 and has its elongate central
rtion 58 reduced in lateral width such as to provide a
lewise projecting bearing edge 60 at each corner por-
n of the block. The bearing edges 60 are adapted to
dingly engage the inner surfaces of the front and back
rtions of the channel to guide the block against wedg-
; in a direction substantially parallel to the axis of the
/ot 54. The end portion of the pivot 54 extends through
aperture 62 formed at the exact central portion of the
aring block 56 and is held therein by means of a washer
and a head 66 on said pivot pin.
The block 56 is further recessed on one side at its cen-
l portion so as to provide a seat for the washer 64 and
ad 66 of the pivot pin 54 whereupon the pin will not
erfere with the movement of the bearing block in the
annel.
The bearing block 56 and the depending plate 52 are
apted to pivot relative to each other about the axis of
: pivot pin 54 in an obvious manner. The elongate
e portions 67 of the bearing block 56 contain a pair of
:eways 68 formed throughout the longitudinal dimen-
n of the bearing block. The ends of the raceways are
rved upwardly or outwardly as at 70 so as to provide
utment or stop surfaces for a later-to-be-described pur-
se. The raised portion 71 between the raceways may be
minated without departing from the invention.
Seated in the raceways 68 are a plurality of bearing
ments 72, each one of which has a pair of radially en-
ged toroidal bearing surfaces 74 axially spaced from
ch other with a pair of pintles or end portions 76 ex-
iding axially outwardly from the opposite sides thereof.
ie toroidal bearing surfaces 74 are adapted to opera-
ely engage the inner surfaces of the spaced top and bot-
n walls 48 of the C-shaped channel member 44. A
rrier member 78 is positioned in the space between the
le portions 67 of the bearing block 56 and the walls 48
the channel 44 and are adapted to engage with and
igitudinally space the bearing elements 72 throughout
substantial portion of the longitudinal length of the
aring block 56. The carrier 78 is shaped such that the
atles 76 on the bearing elements 72 engage in apertures
formed in spaced sections 82 along the length of the
rrier. The intermediate sections 84 of the carrier 78
: fastened together with rivets 86 or the like so that
: bearing elements are free to rotate about their own
es relative to the carrier.
Due to the raised portion 70 at the ends of the raceways
the bearing block 56, it is readily apparent that the
aring block can be moved along the longitudinal axis of
: channel member 44 a limited amount such that when
: end rollers 72 engage with the raised portions 70 on
e end of the bearing block, further motion in that direc-
n along the longitudinal axis of the channel member 44
ll be prevented. A like limited amount of motion along
: channel 44 is permitted in the opposite direction such
at the pivot pin 54 in effect is free to move along the axis
the channel member 44 an amount somewhat less than
: length of the bearing block 56. The amount of motion
the bearing block can be controlled by the number of
aring elements 72 and their spacing along the raceways Since the bearing elements 72 substantially support the
aring block 56 relative to the channel member 44
roughout a major portion of the length of said bearing
ock, it is not possible to tilt the bearing block longi-
tudinally relative to the channel 44 no matter how far
off axis the loading may be or how much vibration is
transmitted to the cross-head type bearing structure.

In operation, with a load being transmitted along the
axis of the shaft 22 to the bracket 40 supporting the chan-
nel member 44, the pivot pin 54 will transmit a force to
the plate 52 carried by the driven member such that even
though the axis of the pivot pin 54 is spaced along the axis
of the channel member 44 away from the center line of
the drive shaft 22 the bearing block 56, through the bear-
ing element 72, will transmit the force from the channel
44 to the plate 52 without canting or wedging the one
element relative to the other. The forces will always
be efficiently transmitted from the shaft 22 through the
carrier member 44 to the bearing block 56 and pivot pin
54 to the driven member in an operative manner. As
the forces being transmitted to the channel 44 along an
axis perpendicular to the longitudinal axis of the channel
are being transmitted to the pivot 54, the bearing block
will roll longitudinally relative to the channel 44 on the
rollers 72 to a location wherein the direction of forces
from the pivot 54 are along an axis capable of moving the
driven member toward its final position. That is, referring
to FIGURE 1, with the forces applied along the shaft 22
of the intermediate dotted-line position of frame 32', the
force on the pivot 54 tending to lower the window will
be transmitted through the channel 44 and rollers 72 to
the bearing block 56 and the pivot 54. As the pivot 54
moves down the axis 34, it will move closer to the axis of
the shaft 22 which will be made possible by means of the
bearing block rolling on the bearing elements 72 along
the longitudinal axis of the channel. At no point in the
movement of the pivot 54 along the axis of the channel
44 will the pivot 54 be unsupported by rollers 72 relative
to the channel, so that the bearing block is always sup-
ported on rollers relative to the different forces being
transmitted between the driving and driven members.

The cross-head bearing herein shown and described can
be used with any type of motion-transmitting device
wherein it is desired to transmit a force from along one
axis to a different axis, either parallelly disposed, angu-
larly disposed and/or offset relative to the first-named
axis. In the illustrated embodiment of my invention, I
have shown the cross-head bearing in use for raising and
lowering the window of an automotive vehicle wherein the
driving force is transmitted along the shaft 22 and through
the action of the cross-head bearing, a driven member
32 and window 12 is raised and lowered. In accomplish-
ing the raising and lowering, the pivot pin 54 is moved
in the plane of the window along an oscillating path 34
from one side of the axis of the shaft 22 to the other side,
such that, as shown in FIGURE 2, the pivot pin 54 and
bearing block 56 will move along the longitudinal axis of
the bearing block by means of the rolling action of the
bearing element 72 relative to the channel 44 a predeter-
mined amount in both directions without wedging or
jamming the motion-transmitting mechanism 30 relative
to the frame 32 of the window 12.

From the foregoing, it is obvious that I have accom-
plished the objects in my invention and have provided an
improved cross-head type bearing that is operative under
all conditions of use and is substantially free from failure
or malfunction due to binding or wedging during its cycle
of operation. My improved bearing has built-in limiting
means for controlling movement of the members relative
to each other, is compact in size, efficient in use and
economically manufactured and assembled.

Having thus described my invention, it is obvious that
various other modifications may be made in the same with-
out departing from the spirit of my invention; hence I do
not wish to be understood as limiting myself to the exact
forms, constructions, arrangements and combinations of
parts herein shown and described or uses mentioned.

I claim:

1. A cross-head type force-transmitting device for interconnecting a reciprocative drive member and a driven member guided for compound motions including zigzagging along the path of said drive member comprising a C-shaped channel member for disposal transversely between said drive member and driven member and including means for fixing the channel member to one of said first-named members, an elongate bearing block in and movable along said channel member, means pivotally mounted on the intermediate portion of said block and extending through the open side of the channel member for connection to the other of said first-mentioned members, raceway means formed in the elongate opposite edge portions of said bearing block, a plurality of bearing elements having radially enlarged toroidal bearing surfaces engaging in said raceway means and operatively engaging with the inner side portions of the channel member, stop means at the ends of said raceway means limiting movement of the bearing elements and block relative to the channel member, and carrier means longitudinally spacing said bearing elements relative to each other.

2. A motion-transmitting bearing structure for interposition between a reciprocative drive member and a driven member, the driven member being guided for movement in an irregular path running generally in the direction of movement of said drive member comprising a C-shaped channel member having means for fixedly mounting same to and transversely of the path of movement of said drive member, an elongate bearing block in and movable along said channel member, means pivoted centrally of said block and projecting through the open side of said channel member for connection with said driven member, a pair of spaced raceways formed in the elongate opposite edge portions of said bearing block, raised portions formed at the end portions of said raceways, a plurality of bearing elements having a pair of radially enlarged toroidal bearing surfaces engaging in said raceways and operatively contacting the inner side portions of the channel member, and carrier means engaging with said bearing elements to longitudinally space said bearing elements relative to said bearing block.

3. A cross-head type force-transmitting structure for interposition transverse to a reciprocative driving member and a reciprocative driven member comprising a channel-shaped structure having an opening extending along one side thereof, and also having mounting means for rigid connection with one of said members, an elongate bearing block in and movable along said channel means, pivot means carried by the central portion of said bearing block and extending through said opening in the channel means for operative connection with the other of said members, guide means formed in the elongate opposite edge portions of said bearing block, a plurality of bearing elements engaging with said guide means and operatively contacting the inner side portions of the channel means, and carrier means engaging with said bearing elements to longitudinally space said bearing elements relative to said bearing block whereby movement of the driving member is transmitted to the driven member.

4. A slidable cross-head structure for disposition transversely between and connection to a reciprocative driving member and a reciprocative driven member, the latter member being guided along an irregular path running generally along that of the driving member, comprising a channel member having an opening extending along one side thereof and further having mounting means for rigid connection to said driving member, an elongate bearing block movably mounted in said channel member, pivot means carried by said bearing block and projecting through said opening in the channel member for operative connection with said driven member, guide means formed in the elongate opposite edge portions of said bearing block, a plurality of bearing elements engaging in said guide means and operatively contacting the inner side portions of the channel member, stop means in said guide means for limiting the longitudinal movement of the bearing elements relative to the guide means, and carrier means engaging with said bearing elements to space said bearing elements along said bearing block.

References Cited in the file of this patent

UNITED STATES PATENTS

| Re. 23,461 | Gussack | Feb. 12, 1952 |
| 672,337 | Stanley | Apr. 16, 1901 |
| 1,149,889 | Beemer | Aug. 10, 1915 |
| 1,265,027 | Alldread | May 7, 1918 |
| 1,528,363 | Bronander | Mar. 3, 1925 |
| 2,207,466 | Martens | July 9, 1940 |
| 2,763,508 | Gelfand | Sept. 18, 1956 |
| 2,872,184 | Wise | Feb. 3, 1959 |

FOREIGN PATENTS

| 436,331 | Germany | Nov. 1, 1926 |